(12) United States Patent
Sugaya (10) Patent No.: US 10,645,210 B2
(45) Date of Patent: May 5, 2020

(54) SYSTEM, METHOD, AND PROGRAM FOR PROVIDING INFORMATION

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/753,635

(22) PCT Filed: Mar. 30, 2017

(86) PCT No.: PCT/JP2017/013262
§ 371 (c)(1),
(2) Date: Feb. 20, 2018

(87) PCT Pub. No.: WO2018/179229
PCT Pub. Date: Oct. 4, 2018

(65) Prior Publication Data
US 2020/0014785 A1    Jan. 9, 2020

(51) Int. Cl.
*H04M 1/725* (2006.01)
*G06F 3/0484* (2013.01)
(Continued)

(52) U.S. Cl.
CPC ...... *H04M 1/7255* (2013.01); *G06F 3/04842* (2013.01); *H04M 1/72552* (2013.01);
(Continued)

(58) Field of Classification Search
CPC ...... H04M 1/7255; H04M 3/50; H04M 3/493; H04M 1/72552; H04M 2203/252;
(Continued)

(56) References Cited

U.S. PATENT DOCUMENTS

| | | | |
|---|---|---|---|
| 8,671,149 B1 * | 3/2014 | Baxter, Jr. | H04L 51/04 709/206 |
| 9,124,695 B1 * | 9/2015 | George | G06F 3/04842 |

(Continued)

FOREIGN PATENT DOCUMENTS

| | | |
|---|---|---|
| JP | 2013-66128 | 4/2013 |
| JP | 2015-029334 | 2/2015 |
| JP | 2015-531199 | 10/2015 |

OTHER PUBLICATIONS

"Transcosmos Releases "Contact-Link for V-IVR", a Smartphone Optimized Visual IVR Service Drives omni-channel-based contact center operation", Press Release, transcosmoc inc., Sep. 20, 2016, http://www.trans-cosmos.co.jp/company/news/160920_0001.html.

*Primary Examiner* — Akelaw Teshale
(74) *Attorney, Agent, or Firm* — Lex IP Meister, PLLC (57) ABSTRACT

The present invention is to provide a system that is capable to interface with an automated voice response (IVR) system for existing phone calls and to display voice messages of an IVR by texts. The system for providing information 1 of the present invention includes a terminal 10 and an automated voice response system 80. The control unit 20 of the terminal 10 performs the activation module 21 to activate the display program 41 that is to display the voice message provided from the automated voice response system 80 on the image display unit 70 when making a call to the automated voice response system 80 through a phone. Then, when the voice message display module 23 is operated, the image display unit 70 displays the voice message provided from the automated voice response system 80 to the terminal 10.

4 Claims, 5 Drawing Sheets

(51) Int. Cl.
*H04M 3/493* (2006.01)
*H04M 3/50* (2006.01)

(52) U.S. Cl.
CPC ............ *H04M 3/493* (2013.01); *H04M 3/50* (2013.01); *H04M 2203/252* (2013.01); *H04M 2250/56* (2013.01)

(58) Field of Classification Search
CPC .... H04M 2250/56; H04M 1/247; H04M 1/00; G06F 3/04842
See application file for complete search history.

(56) References Cited

U.S. PATENT DOCUMENTS

| | | | |
|---|---|---|---|
| 9,955,022 B2 * | 4/2018 | Jain | H04M 15/10 |
| 2006/0285662 A1 * | 12/2006 | Yin | H04M 3/42382 |
| | | | 379/88.16 |
| 2008/0159495 A1 * | 7/2008 | Dahan | H04M 3/4938 |
| | | | 379/93.01 |
| 2010/0217816 A1 * | 8/2010 | Smelyansky | H04L 51/066 |
| | | | 709/206 |
| 2011/0009096 A1 * | 1/2011 | Rotsztein | H04M 3/5191 |
| | | | 455/412.1 |
| 2012/0045043 A1 * | 2/2012 | Timpson | H04M 3/493 |
| | | | 379/88.04 |
| 2012/0311585 A1 * | 12/2012 | Gruber | G06Q 10/109 |
| | | | 718/100 |
| 2013/0003957 A1 * | 1/2013 | Singh | H04M 3/493 |
| | | | 379/218.01 |
| 2014/0112465 A1 * | 4/2014 | Sartini | H04M 3/2218 |
| | | | 379/265.09 |
| 2015/0215457 A1 | 7/2015 | Kim | |

\* cited by examiner

SKELETON FRAMEWORK OF RESPONSE MESSAGE DISPLAY PROMPT
DATABASE 42 AND
VOICE RESPONSE PROMPT DATABASE 111

FIG. 4

ID SOUND DATABASE 112

| ID number | ID sound |
|---|---|
| 1 | ID sound A |
| 11 | ID sound B |
| 111 | ID sound C |
| 112 | ID sound D |
| 1121 | ID sound E |
| 1122 | ID sound F |
| 113 | ID sound G |
| 114 | ID sound H |
| 12 | ID sound I |
| 13 | ID sound J |
| 131 | ID sound K |
| 132 | ID sound L |

FIG. 5

EXTENSION NUMBER DATABASE 113

| ID number | Extention number |
|---|---|
| 111 | 1234 |
| 1121 | 5678 |
| 1122 | 9876 |
| 113 | 5432 |
| 114 | 1357 |
| 131 | 2468 |
| 132 | 9753 |

SYSTEM, METHOD, AND PROGRAM FOR PROVIDING INFORMATION

TECHNICAL FIELD

The present invention relates to a system, a method, and a program for providing information.

BACKGROUND ART

IVR (Interactive voice response) that enables a machine to respond and provide guidance by voice when banks, customer support services, etc. widely receive calls from general people is known.

However, since IVR provides guidance by voice through a phone, the listener who is the customer should keep listening to the guidance. For example, people have to keep listening to an audio guidance message such as "To make an inquiry about purchase of our product please press '1,' to receive an explanation on our product please press '2,' and to consult about the fault of our product please press '3'." even though making a call about the fault of a product. For another example, people also have to keep listening to an audio guidance message such as "To play the message please press '1,' to save the message please press '2,' and to delete the message please press '3'." even when checking a message stored in an answering machine system. First of all, if the guidance messages are displayed on the screen, the time to listen to the guidance can be reduced, and also the listener should not listen through to the end.

Therefore, the system called visual IVR using a smart phone is proposed (for example, refer to Patent Document 1 and Non-Patent Document 1).

CITATION LIST

Patent Literature

Patent Document 1: JP 2015-029334A

Non-Patent Literature

Non-Patent Document 1: transcosmos inc, transcosmos started Visual IVR service for a smart phone, "Contact-Link for V-IVR," retrieved from http://www.trans-cosmos.co.jp/company/news/160920_0001.html

SUMMARY OF INVENTION

However, this system is capable to merely input information by using the display unit of a smart phone and thus has room for improvement in interface with IVR.

In view of such demand, an objective of the present invention is to provide a system that is capable to interface with an IVR system for existing phone calls and to display voice messages from IVR by texts.

The first aspect of the present invention provides a system for providing information, including:

an activation unit that activates a display program of an automated voice response system if the automated voice response system receives a call through a phone; and a voice message display unit that displays a voice message provided from the automated voice response system when the display program is activated.

According to the first aspect of the present invention, the voice message display unit displays a voice message provided from the automated voice response system. Accordingly, the present invention can provide a system that is capable to interface with an IVR system for existing phone calls and to display voice messages from IVR by texts.

The second aspect of the present invention provides the system according to the first aspect of the present invention, in which the voice message display unit changes a response prompt that displays the voice message in response to input from a user.

Accordingly, the second aspect of the present invention causes no difference between the voice message provided from the automated voice response system and the voice message displayed on the voice message display unit.

The third aspect of the present invention provides the system according to the first or the second aspect of the present invention, further including:

a check unit that checks whether or not the voice message displayed on the voice message display unit and the voice message provided from the automated voice response system are the same if an ID sound to identify the voice message of the automated voice response system is received from the automated voice response system.

Accordingly, the third aspect of the present invention causes no difference between the voice message provided from the automated voice response system and the voice message displayed on the voice message display unit.

The present invention can provide a system that is capable to interface with an IVR system for existing phone calls and to display voice messages from IVR by texts.

DESCRIPTION OF EMBODIMENTS

Embodiments of the present invention will be described below with reference to the attached drawings. However, this is illustrative only, and the technological scope of the present invention is not limited thereto.

Configuration of System for Providing Information 1

Figure 1:
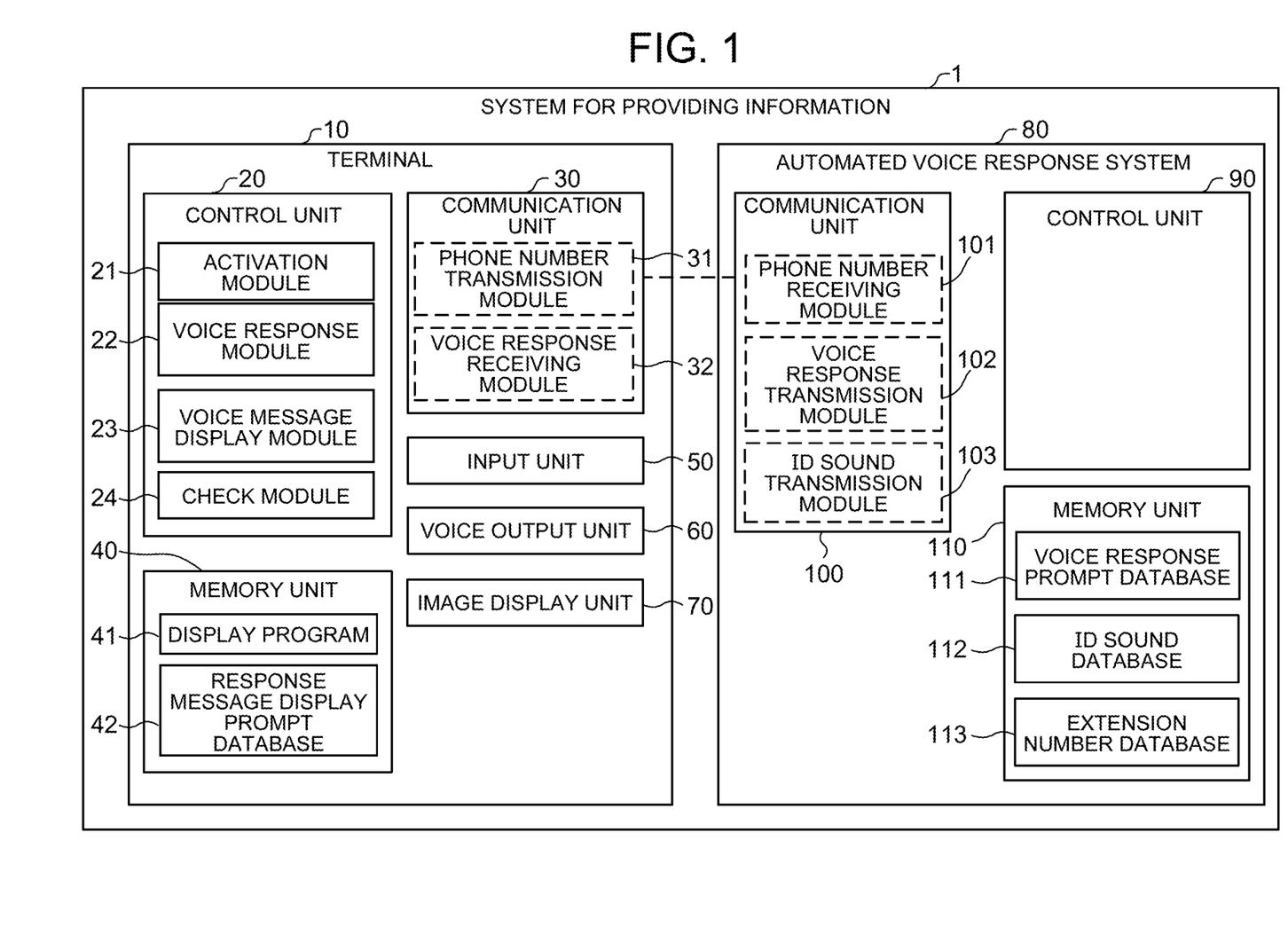
FIG. 1 shows a block diagram illustrating a hardware configuration and a software function of the system for providing information 1 in an embodiment.

FIG. 1 shows a block diagram illustrating a hardware configuration and a software function of the system for providing information 1 in an embodiment.

The system for providing information 1 includes a terminal 10 that is managed by the provider of a search engine, used by a user from a number of web sites, and provided with a phone call function and an automated voice response system 80 (IVR system) that is electrically connected with the terminal 10, the automated voice response system 80 that responds by using a voice previously recorded or dynamically generated and instructs the user how to continue the operation.

Terminal 10

The terminal 10 at least includes a control unit 20 that controls data, a communication unit 30 that communicates with other devices, a memory unit 40 that stores data, an input unit 50 that receives operation from the user, an voice output unit 60 that outputs a voice message transmitted from the automated voice response system, and an image display unit 70 that outputs and displays the data and images controlled by the control unit 20.

The type of the terminal 10 is not limited in particular as long as the terminal 10 has a function to call the automated voice response system 80 through a phone. Examples of the terminal 10 include a mobile phone terminal such as a smart phone.

The control unit 20 includes a central processing unit (hereinafter referred to as "CPU"), a random access memory (hereinafter referred to as "RAM"), and a read only memory (hereinafter referred to as "ROM").

The communication unit 30 includes a device that is communicative to other devices, such as a Wireless Fidelity (Wi-Fi®) enabled device complying with, for example, IEEE 802.11.

The control unit 20 reads a predetermined program from the memory unit 40 to achieve an activation module 21, a voice response module 22, a voice message display module 23, and a check module 24.

Moreover, the control unit 20 reads a predetermined program to achieve a phone number transmission module 31 and a voice response receiving module 32 in cooperation with the communication unit 30.

The memory unit 40 is to store data and files and includes a data storage unit such as a hard disk, a semiconductor memory, a record medium, or a memory card. The memory unit 40 stores the display program 41 and a response message display prompt database 42 that are to be described later.

The type of the input unit 50 is not limited in particular as long as the input unit 50 is capable to input at least the numbers "0" to "9." Examples of the input unit 50 include a keyboard and a touch panel.

The type of the voice output unit 60 is not limited in particular. Examples of the voice output unit 60 include a speaker.

The type of the image display unit 70 is not limited in particular. Examples of the image display unit 70 include a monitor and a touch panel.

Automated Voice Response System 80

The automated voice response system 80 at least includes a control unit 90 that controls data, a communication unit 100 that communicates with other devices, and a memory unit 110 that stores data.

The control unit 90 includes a CPU, a RAM, and a ROM in the same way as the control unit 20.

The communication unit 100 includes a device that is communicative with other devices in the same way as the communication unit 30.

The control unit 90 reads a predetermined program from the memory unit 110 to achieve a phone number receiving module 101 and a voice response transmission module 102 in cooperation with the communication unit 100.

The memory unit 110 includes a data storage unit such as a hard disk, a semiconductor memory, a record medium, or a memory card in the same way as the memory unit 40. The memory unit 110 stores the voice response prompt database 111, the ID sound database 112 and the extension number database 113 that are to be described later.

Flow Chart Illustrating How to Provide Information with the System for Providing Information 1

Figure 2:
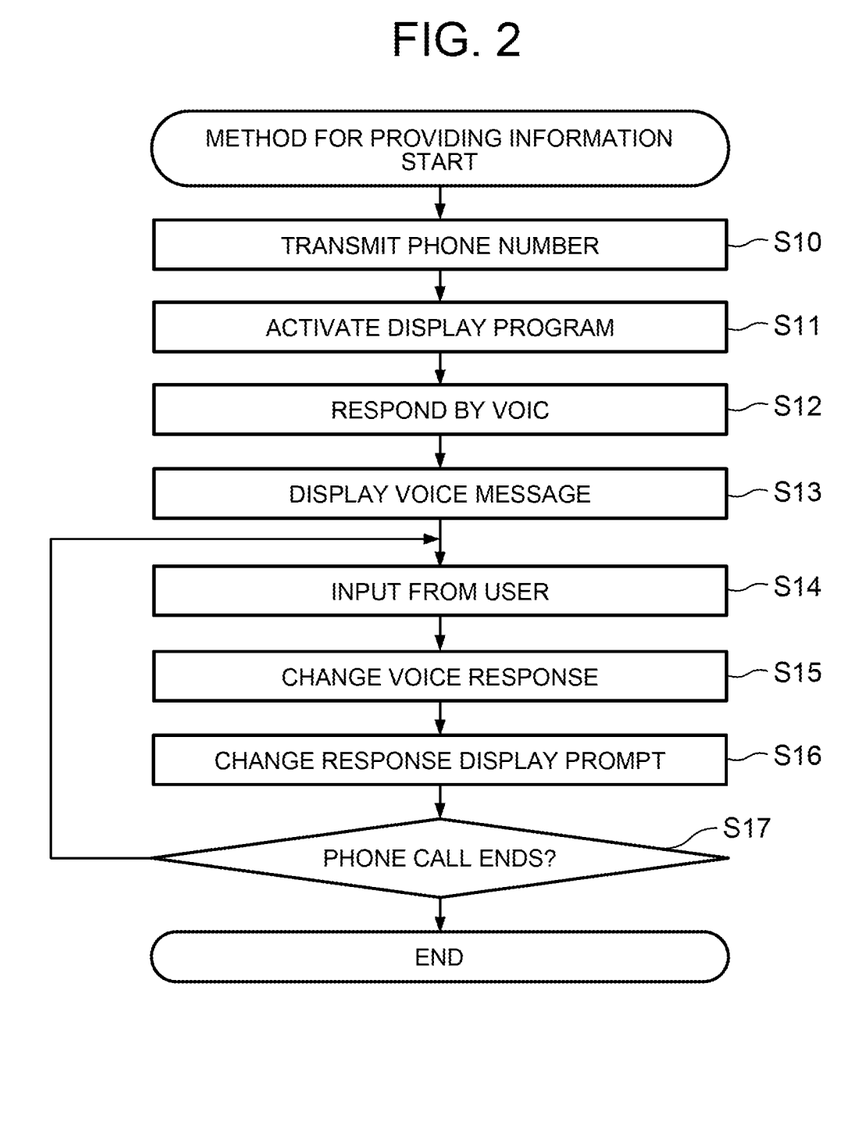
FIG. 2 shows a flow chart illustrating how to provide information in the embodiment.

FIG. 2 shows a flow chart illustrating how to detect an abnormality by using the system for providing information 1. The tasks executed by the modules of the above-mentioned hardware and software will be described below.

Step S10: Transmit Phone Number

The control unit 20 of the terminal 10 reads a predetermined program from the memory unit 40 to perform the phone number transmission module 31 in cooperation with the communication unit 30 in response to user's operation from the input unit 50 of the terminal 10.

Step S11: Activate Display Program 41

This step checks whether or not the phone number transmitted in the step S10 is to connect with the automated voice response system 80. If the phone number transmitted in the step S10 is to connect with the automated voice response system 80, the control unit 20 of the terminal 10 performs the activation module 21 to activate the display program 41 that is to display the voice message provided from the automated voice response system 80 on the image display unit 70 (Step S11).

Step S12: Respond by Voice

The control unit 90 of the automated voice response system 80 reads a predetermined program from the memory unit 110 to perform the phone number receiving module 101 in cooperation with the communication unit 30.

Then, the control unit 90 of the automated voice response system 80 refers to the voice response prompt database 111 to generate a voice response to be transmitted to the terminal 10.

Subsequently, the control unit 90 of the automated voice response system 80 reads a predetermined program from the memory unit 110 to perform the voice response transmission module 102 that transmits the generated voice response to the terminal 10 in cooperation with the communication unit 30.

The control unit 20 of the terminal 10 reads a predetermined program from the memory unit 40 to perform the voice response receiving module 32 that causes the voice output unit to output the voice response received from the automated voice response system 80 in cooperation with the communication unit 30 (Step S12).

Figure 3:
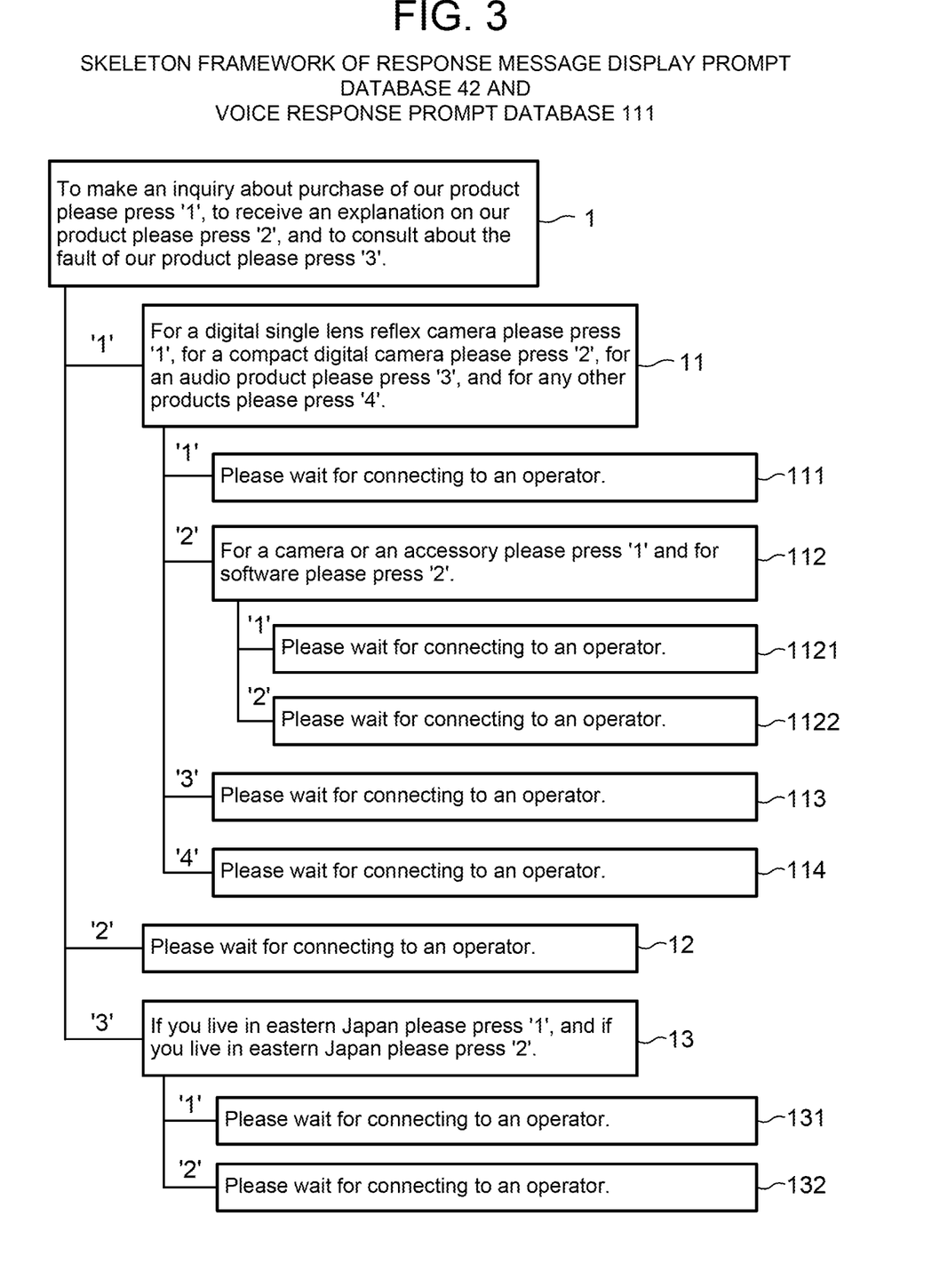
FIG. 3 shows a skeleton framework of the voice response prompt database 111 if the automated voice response system 80 is of a camera and audio instrument manufacturer.

FIG. 3 shows a skeleton framework of the voice response prompt database 111 if the automated voice response system 80 is of a camera and audio instrument manufacturer.

First, the control unit 90 of the automated voice response system 80 sets the data associated with the identification number "1," "To make an inquiry about purchase of our product please press '1,' to receive an explanation on our product please press '2,' and to consult about the fault of our product please press '3'." as data on a voice response to the terminal 10.

Then, if detecting that the button '1' is pressed on the terminal 10, the control unit 90 changes the data on a voice response to the terminal 10 by switching from the data associated with the identification number "1" to the data associated with the identification number "11," "For a digital single lens reflex camera please press '1', for a compact digital camera please press '2,' for an audio product please press '3,' and for any other products please press '4.'

If detecting that the button '2' is pressed on the terminal 10, the control unit 90 changes the data on a voice response to the terminal 10 by switching from the data associated with the identification number "1" to the data associated with the identification number "12," "Please wait for connecting to an operator."

In the same way, the control unit 90 switches the data on a voice response to the terminal 10 one by one according to the types of the buttons operated from the terminal 10.

Since the step S12 is an initial stage in which the terminal 10 calls to the automated voice response system 80, the control unit 90 sets the data associated with the identification number "1" as the data on a voice response to the terminal 10.

As shown in FIG. 2, the data associated with the identification number "1" is set as data on a voice response to the terminal 10 in the step S12. Then, the control unit 90 performs the voice response transmission module 102 to transmit the voice response associated with the identification number "1," "to make an inquiry about purchase of our product please press '1,' to receive an explanation on our product please press '2,' and to consult about the fault of our product please press '3'." to the terminal 10.

Subsequently, the control unit 20 of the terminal 10 reads a predetermined program from the memory unit 40 to perform the voice response receiving module 32 that causes the voice output unit 60 to output the voice response received from the automated voice response system 80 in cooperation with the communication unit 30.

To illuminate the invention described in this embodiment, the automated voice response system 80 is assumed to be of a camera and audio instrument manufacturer in the following description unless otherwise specified.

Step S13: Display Voice Message

The control unit 20 of the terminal 10 reads the display program 41 from the memory unit 110 to perform the voice message display module 23. This causes the control unit 20 to refer to the response message display prompt database 42 stored in the memory unit 40 and then set the data on the image to be displayed on the image display unit 70. The control unit 20 displays the set image on the image display unit 70 (Step S13).

The configuration of the response message display prompt database 42 is the same as that of the voice response prompt database 111 (FIG. 3). The initial value of the identification number is set to "1." Thus, as the data on the image to be displayed on the image display unit 70, data on the image associated with the identification number "1," "To make an inquiry about purchase of our product please press '1,' to receive an explanation on our product please press '2,' and to consult about the fault of our product please press '3'." Then, the control unit 20 displays the set image on the image display unit 70.

According to this embodiment, the image display unit 70 displays a voice message provided from the automated voice response system 80. Accordingly, the present invention can provide a system that is capable to interface with an automated voice response system 80 for existing phone calls and to display voice messages by texts.

Step S14: Input from User

The control unit 20 of the terminal 10 reads a predetermined program from the memory unit 40 to perform the phone number transmission module 31 in cooperation with the communication unit 30 in response to user's operation from the input unit 50 of the terminal 10.

Then, the control unit 90 of the automated voice response system 80 reads a predetermined program from the memory unit 110 to achieve a phone number receiving module 101 in cooperation with the communication unit 30.

Step S15: Change Voice Response

The control unit 90 of the automated voice response system 80 reads a predetermined program from the memory unit 110 to refer to the voice response prompt database 111 and change the data on a voice response to be transmitted to the terminal 10 in cooperation with the communication unit 100 in response to user's operation from the input unit 50 of the terminal 10 (Step 15).

For example, if detecting that the button '1' is pressed on the terminal 10, the control unit 90 changes the data on a voice response to the terminal 10 by switching from the data associated with the identification number "1" to the data associated with the identification number "11," "For a digital single lens reflex camera please press '1', for a compact digital camera please press '2,' for an audio product please press '3,' and for any other products please press '4.'"

If detecting that the button '2' is pressed on the terminal 10, the control unit 90 changes the data on a voice response to the terminal 10 by switching from the data associated with the identification number "1" to the data associated with the identification number "12," "Please wait for connecting to an operator."

In the same way, the control unit 90 switches the data on a voice response to the terminal 10 one by one according to the types of the buttons operated from the terminal 10.

The control unit 90 of the automated voice response system 80 preferably refers to the ID sound database 112 stored in the memory unit 110 to generate a notification sound (ID sound) based on which the terminal 10 identifies the voice message of the automated voice response system 80. This enables the terminal 10 to check whether or not the voice message displayed on the image display unit 70 and the voice message provided from the automated voice response system 80 are the same.

Figure 4:
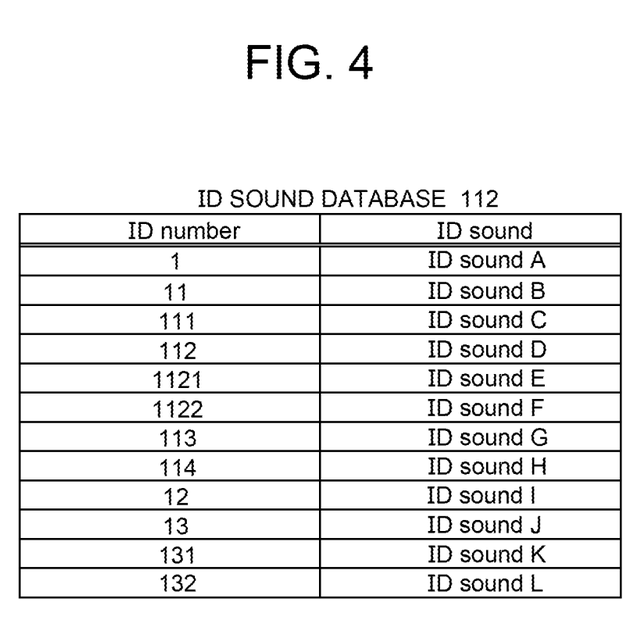
FIG. 4 shows an example of the ID sound database 112 according to the embodiment.

FIG. 4 shows an example of the ID sound database 112. In the ID sound database 112, the notification sound (ID sound) is associated with the identification number in the voice response prompt database 111.

The control unit 90 transmits the voice response associated with the changed identification number and optionally the ID sound to the terminal 10.

Subsequently, the control unit 20 of the terminal 10 reads a predetermined program from the memory unit 40 to perform the voice response receiving module 32 that causes the voice output unit 60 to output the voice response received from the automated voice response system 80 in cooperation with the communication unit 30.

When the data on a voice response is changed to the data associated with the identification number "12," "Please wait for connecting to an operator.," the control unit 90 refers to the extension database 113 stored in the memory unit 110.

Figure 5:
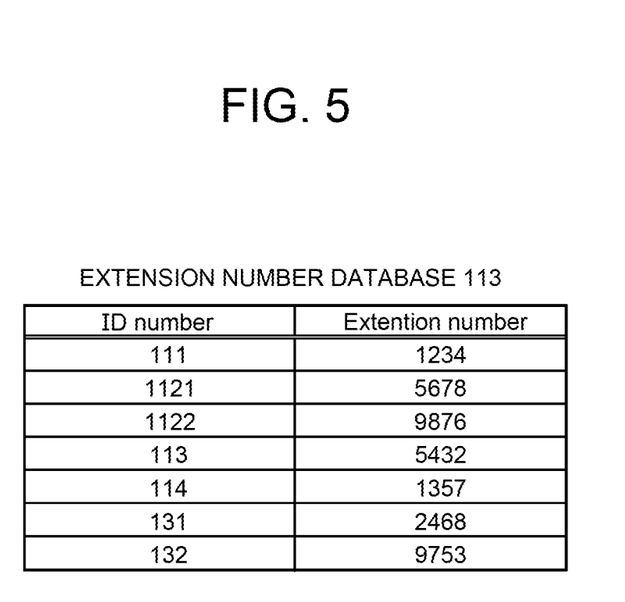
FIG. 5 shows an example of the extension number database 113 according to the embodiment.

FIG. 5 shows an example of the extension number database 113. In the extension number database 113, the extension number of a department that is associated with an identification number is associated with the identification number in the voice response prompt database 111. This enables the control unit 90 to forward the phone call to the phone of a department.

Step S16: Change Response Display Prompt 16

The control unit 20 of the terminal 10 reads the display program 41 from the memory unit 110 to perform the voice message display module 23. This causes the control unit 20 to refer to the response message display prompt database 42 stored in the memory unit 40 and then switch the data on the image to be displayed on the image display unit 70 to the data on the image associated with the voice response transmitted from the automated voice response system 80. The control unit 20 displays the set image on the image display unit 70 (Step S16).

If the terminal 10 receives the ID sound from the automated voice response system 80, the control unit 20 preferably performs the check module 24 to check whether or not the voice message displayed on the image display unit 70 and the voice message transmitted from the automated voice response system 80 are the same. This causes no difference between the voice message provided from the automated voice response system 80 and the voice message displayed on the voice message display unit.

Step S17: Check End of Phone Call

The control unit 20 of the terminal 10 checks whether or not the phone call ends (Step S17). If the check result is YES, the control unit 20 ends the display program 41. If the check result is NO, the control unit 20 passes processing to the step S14.

Operation and Working-Effect of the Present Invention

According to the invention described in this embodiment, the display program 41 is activated if the terminal 10 makes a call to the automated voice response system 80 through a phone and if the activation module 21 is activated. Then, when the voice message display module 23 is operated, the image display unit 70 displays the voice message provided from the automated voice response system 80 to the terminal 10. Accordingly, the present invention can provide a system for providing information 1 that is capable to interface with an automated voice response system 80 for existing phone calls and to display voice messages by texts.

Furthermore, the control unit 20 refers to the response message display prompt database 42 in response to user's operation from the input unit 50 and changes the response prompt to display the voice message on the image display unit 70. This causes no difference between the voice message provided from the automated voice response system 80 and the voice message displayed on the image display unit 70.

Furthermore, in the invention described in this embodiment, if the terminal 10 receives a notification sound (ID sound) to identify the voice message transmitted from the automated voice response system 80, the check module 24 is performed to check whether or not the voice message displayed on the image display unit 70 and the voice message provided from the automated voice response system 80 are the same based on the notification sound (ID sound). This causes no difference between the voice message provided from the automated voice response system 80 and the voice message displayed on the image display unit 70.

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

1 System for providing information
10 Terminal
20 Control unit
21 Activation module
22 Voice response module
23 Voice message display module
24 Check module
30 Communication unit
31 Phone number transmission module
32 Voice response receiving module
40 Memory unit
41 Display program
42 Response message display prompt database
50 Input unit
60 Voice output unit
70 Image display unit
80 Automated voice response system
90 Control unit
100 Communication unit
101 Phone number receiving module
102 Voice response transmission module
103 ID sound transmission module
110 Memory unit
111 Voice response prompt databases
112 ID sound database
113 Extension number database

What is claimed is:

1. A system for providing information by display and voice, comprising:
    an activation unit that activates a display program of an automated voice response system if the automated voice response system receives a call through a phone;
    a voice message display unit that displays a voice message provided from the automated voice response system when the display program is activated; and
    a check unit that checks whether or not the voice message displayed on the voice message display unit and the voice message provided from the automated voice response system are the same if an ID sound to identify the voice message of the automated voice response system is received from the automated voice response system.

2. The system according to claim 1, wherein the voice message display unit changes a response prompt that displays the voice message in response to input from a user.

3. A method for providing information by display and voice, comprising the steps of:
    activating a display program of an automated voice response system if the automated voice response system receives a call through a phone;
    displaying a voice message provided from the automated voice response system when the display program is activated; and
    checking whether or not the displayed voice message and the voice message provided from the automated voice response system are the same if an ID sound to identify the voice message of the automated voice response system is received from the automated voice response system.

4. A non-transitory computer-readable medium that stores a program for causing a system for providing information by display and voice to execute the steps of:
    activating a display program of an automated voice response system if the automated voice response system receives a call through a phone;
    displaying a voice message provided from the automated voice response system when the display program is activated; and checking whether or not the displayed voice message and the voice message provided from the automated voice response system are the same if an ID sound to identify the voice message of the automated voice response system is received from the automated voice response system.

* * * * *